(12) United States Patent
Smead

(10) Patent No.: US 6,766,615 B2
(45) Date of Patent: Jul. 27, 2004

(54) ROOT SAVING PLANT SAUCER

(75) Inventor: Christy S. Smead, Santa Nella, CA (US)

(73) Assignee: California Plastic Products, Tustin, CA (US)

( * ) Notice: Subject to any disclaimer, the term of this patent is extended or adjusted under 35 U.S.C. 154(b) by 0 days.

(21) Appl. No.: 10/350,473

(22) Filed: Jan. 23, 2003

(65) Prior Publication Data

US 2003/0136050 A1 Jul. 24, 2003

Related U.S. Application Data

(60) Provisional application No. 60/351,738, filed on Jan. 24, 2002.

(51) Int. Cl.[7] ............................................... A01G 9/04
(52) U.S. Cl. ............................................................ 47/71
(58) Field of Search ..................................... 47/71, 81

(56) References Cited

U.S. PATENT DOCUMENTS

| | | | |
|---|---|---|---|
| 603,492 A | | 5/1898 | Waterer |
| 2,206,694 A | | 7/1940 | Greene |
| 2,989,205 A | | 6/1961 | Yaws |
| 3,866,351 A | * | 2/1975 | Cobia ............................ 47/81 |
| RE30,657 E | * | 6/1981 | Mason et al. ................... 47/79 |
| 4,553,352 A | * | 11/1985 | Powell et al. ................... 47/71 |
| 4,833,823 A | | 5/1989 | Edwards, III |
| 4,860,491 A | | 8/1989 | Panuski |
| 5,042,197 A | | 8/1991 | Pope |
| 5,142,817 A | * | 9/1992 | Rolf ........................... 47/32.5 |
| 5,209,013 A | | 5/1993 | Sellers |
| D346,568 S | | 5/1994 | Bates |
| D346,764 S | | 5/1994 | Sellers |
| 5,321,909 A | | 6/1994 | Loran |
| 5,341,596 A | * | 8/1994 | Kao ............................. 47/79 |
| D361,308 S | * | 8/1995 | Loran ......................... D11/164 |
| D373,328 S | | 9/1996 | Sellers |
| D373,329 S | | 9/1996 | Sellers |
| 5,582,380 A | | 12/1996 | Hagen |
| D399,787 S | | 10/1998 | Wagner |
| D399,788 S | | 10/1998 | Wagner |
| 5,885,603 A | * | 3/1999 | Fowler et al. ............... 424/405 |
| D411,058 S | | 6/1999 | Sellers |
| D417,330 S | * | 11/1999 | Kim ............................. D99/25 |
| 6,047,499 A | | 4/2000 | Staas |
| 6,125,580 A | | 10/2000 | Fan |
| 6,131,334 A | | 10/2000 | Fan |
| D435,481 S | | 12/2000 | Wagner |
| D436,888 S | | 1/2001 | Sellers |
| D437,803 S | | 2/2001 | Sellers |

FOREIGN PATENT DOCUMENTS

WO     WO 9210085 A1    6/1992

* cited by examiner

Primary Examiner—Charles T. Jordan
Assistant Examiner—Susan C. Alimenti
(74) Attorney, Agent, or Firm—Gregory Smith & Associates; Carol D. Titus

(57) ABSTRACT

A plant saucer having a plurality of internal risers extending upward from the base of the saucer. The internal risers may be of any convenient height and shape to allow excess water to drain from one or more pots placed thereon. The risers may have a round footprint with sloped sides to provide easy mold release. The shape of the risers shown is flat with a textured top surface to promote traction between the pot and the riser. The riser may also have ribs extending up the sides of the riser to allow the riser to support more weight. The saucer has a plurality of feet extending downward from the base of the saucer. The feet are designed to hold the base of the saucer up from the floor on which the saucer rests. The material for the saucer may include an additive, such as Bacillus Thuringiensis (BT) to inhibit the maturation of mosquito larvae.

1 Claim, 6 Drawing Sheets

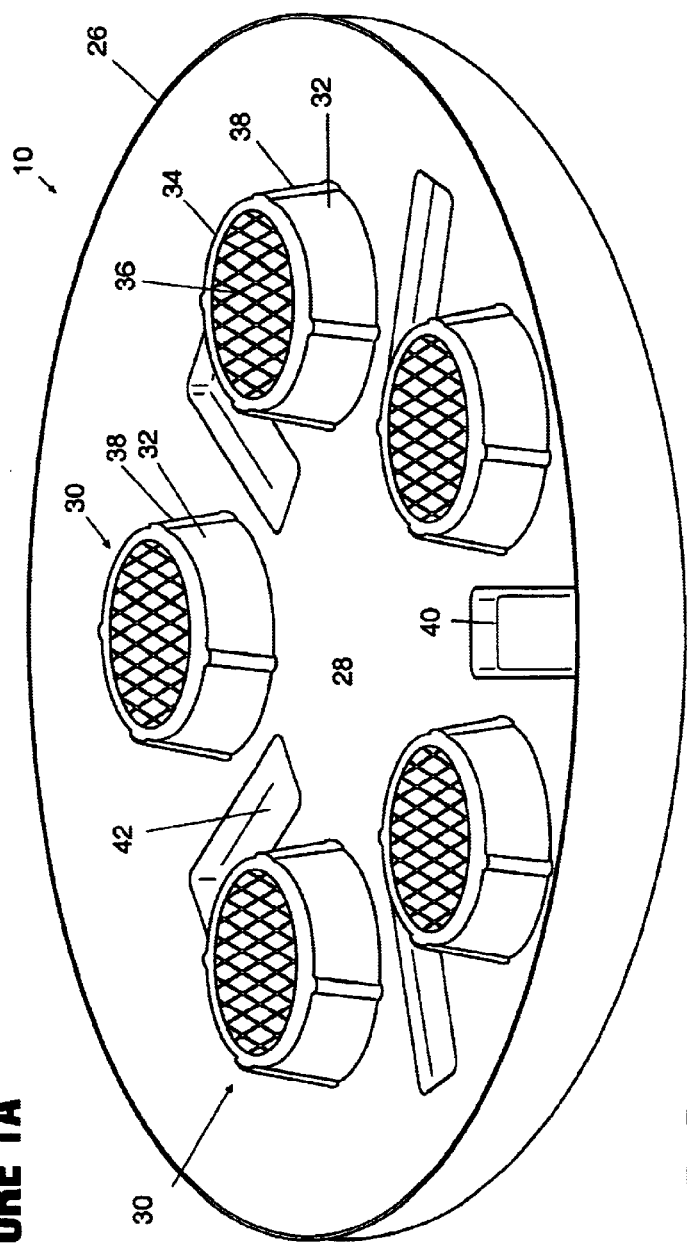
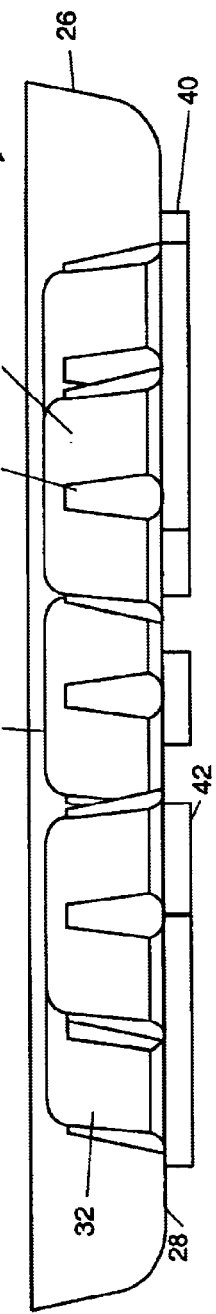
FIGURE 1A
6"
FIGURE 1B

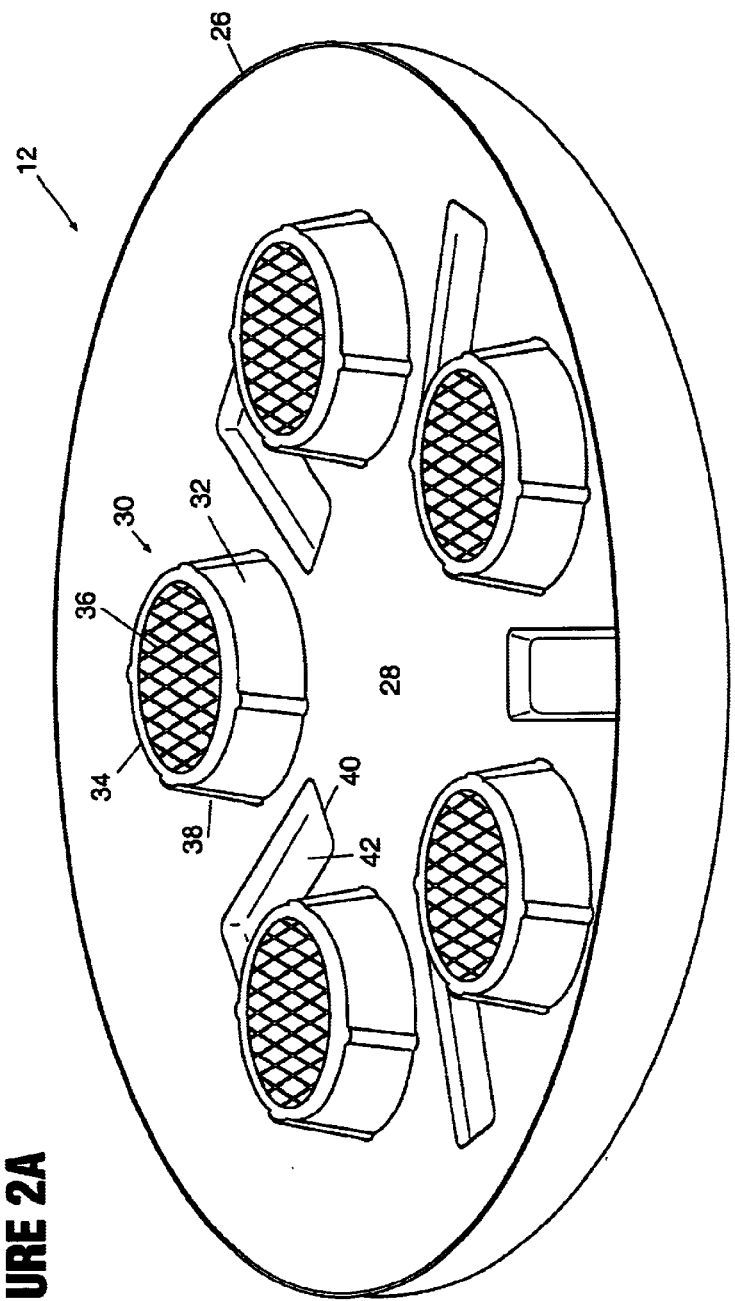
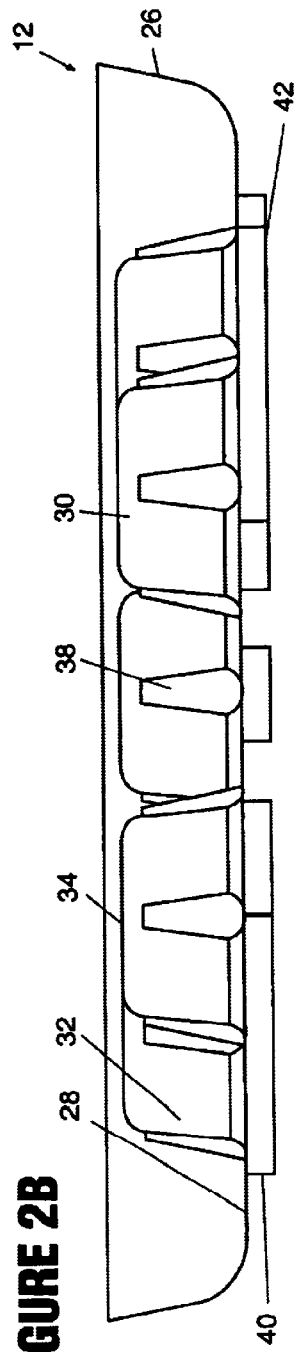
FIGURE 2A
FIGURE 2B

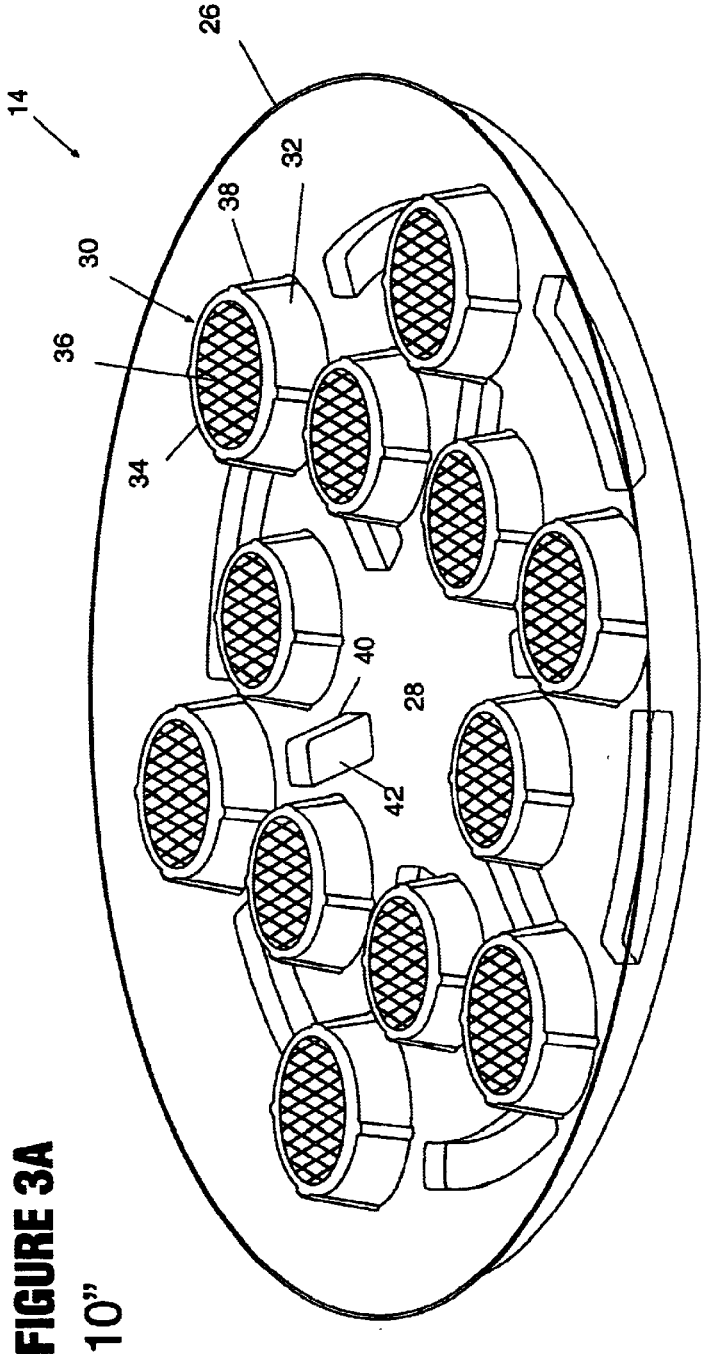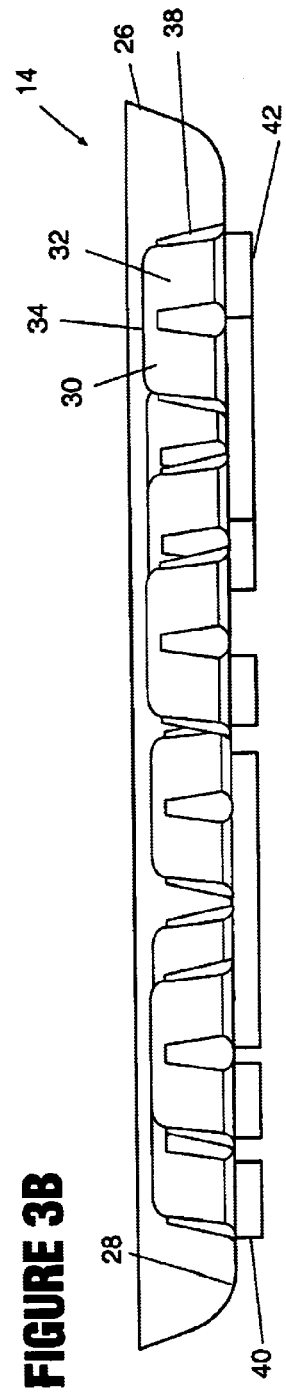
FIGURE 3A
10"
FIGURE 3B

12"

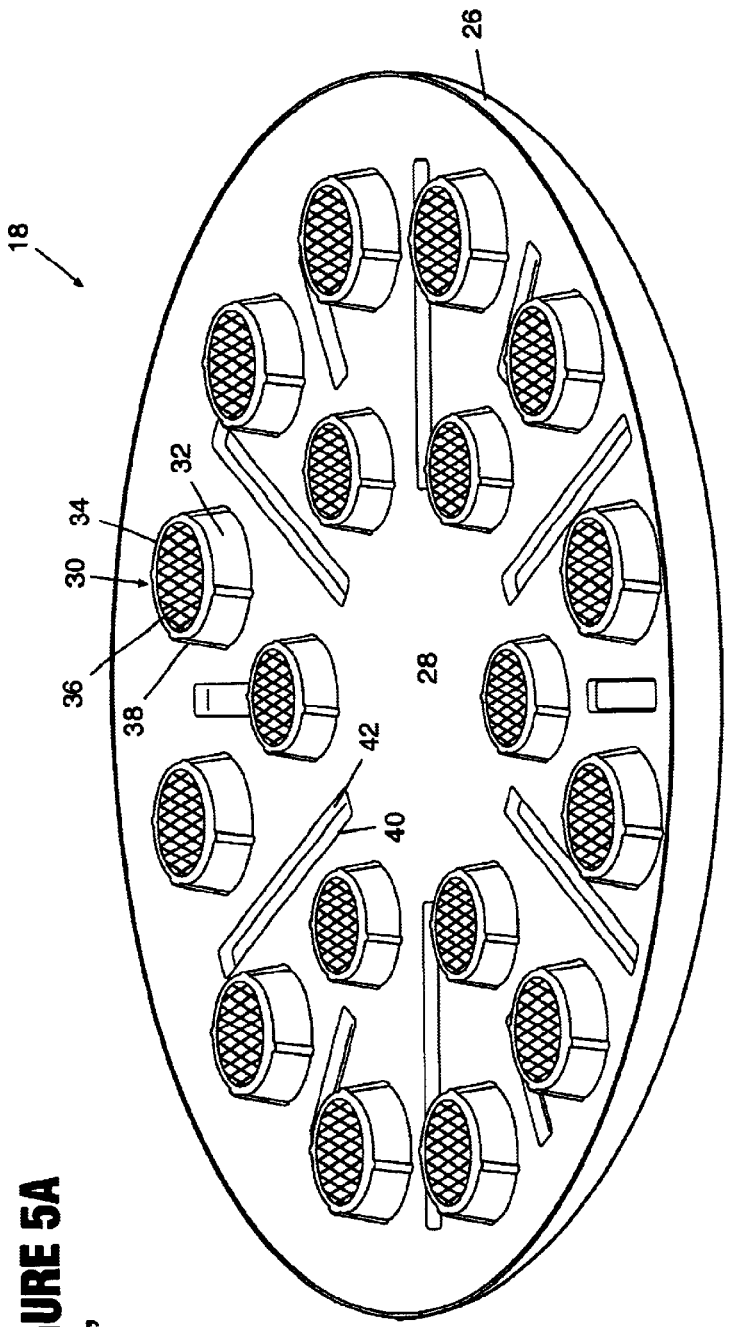
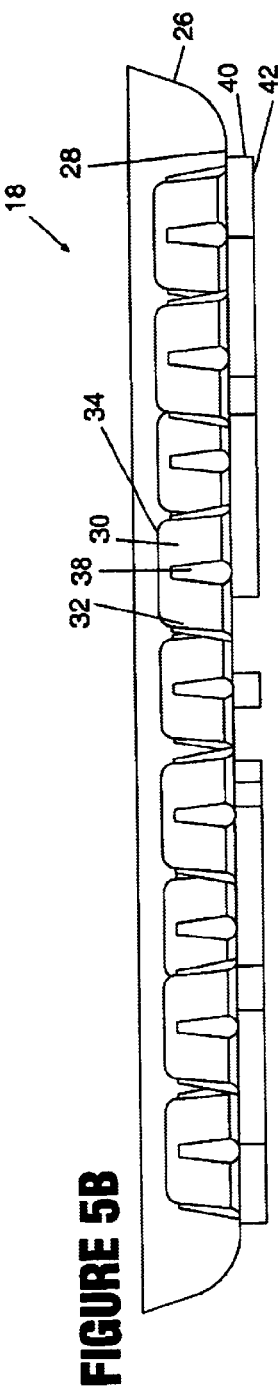
FIGURE 5A
14"
FIGURE 5B

16"

ROOT SAVING PLANT SAUCER

CROSS REFERENCE TO OTHER APPLICATIONS

This application claims the benefit of U.S. Provisional Application No. 60/351,738, filed Jan. 24, 2002, which is hereby incorporated by reference.

FIELD OF INVENTION

The present invention relates generally to saucers for holding plants. More particularly, it relates to a saucer that keeps the potted plant elevated above the water collecting in the saucer during watering or precipitation.

BACKGROUND OF THE INVENTION

There are many prior art devices designed to protect the surface beneath a potted plant. These take the form of plastic trays that prevent the water from contacting the floor or deck. However, when these trays collect even a minimal amount of water, the user must either remove the water from the tray or let the base of the pot soak in the water. It is well known that letting the pot soak in water for even relatively short periods of time promotes root rot, which is one of the most common, if not the most common, cause of death for plants.

SUMMARY OF THE INVENTION

The present invention takes the form of a plant saucer having a plurality of internal risers extending upward from the base of the saucer. The internal risers may be of any convenient height to allow excess water to drain from one or more pots placed thereon. The internal risers may be anywhere between 0.25 inch to 6.0 inches in height. The internal risers hold the pot up substantially from the base level of the saucer, thereby allowing a substantial amount of water to drain into the saucer without building up water within the pot itself. The height of the internal risers also promotes air circulation below the pot to allow any water therein to quickly evaporate, thereby inhibiting root rot from standing water. This also allows for quick and effective humidification of the air around the plant. The internal risers may be of any suitable shape, such as a round footprint with sloped sides, square, rectangular or have any other suitable regular or irregular shape. The risers may have a diameter of anywhere from 0.1 to 5.0 inches. The shape of the internal risers shown is flat with a textured top surface to promote traction between the bottom of the pot and the top of the riser. The internal riser may also have ribs extending up the sides of the riser. The ribs strengthen the riser, thereby allowing the riser to support more weight.

The saucer has a plurality of feet extending downward from the base of the saucer. The feet shown are generally rectangular and/or curved and have a flat bottom surface. The feet may be virtually any height from approximately 0.05 inches. The feet could be used to place the saucer at any height above the ground. For typical situations, a height between 0.05 and 2.0 inches is preferred. The feet may be straight and/or curved, as shown, or they may be jagged or take other forms.

The saucer may be made of any suitable material, such as plastic, metal, etc. Currently the saucers are made of a translucent frosted plastic such as polyethylene terephthalate (PET) or recycled polyethylene terephthalate (RPET). The saucers may also come in a variety of other frosted, clear or opaque colors and styles, including terra cotta, hunter green, red, white, gold, silver, blue, etc. The saucer may be formed in any suitable manner, including vacuum forming, compression molding, injection molding, etc.

The material for the saucer may optionally include additives or coatings. For example, Bacillus Thuringiensis (BT) may be used. BT is a bacterium that is virtually non-toxic to plants, humans and pets, but causes disease in insects, thereby inhibiting the maturation of mosquito larvae.

BRIEF DESCRIPTION OF THE DRAWINGS

FIGS. 1A and 1B are top perspective and side views of a six inch saucer.

FIGS. 2A and 2B are top perspective and side views of an eight inch saucer.

FIGS. 3A and 3B are top perspective and side views of a ten inch saucer.

FIGS. 5A and 5B are top perspective and side views of a fourteen inch saucer.

DETAILED DESCRIPTION OF THE INVENTION

Figure 4A:
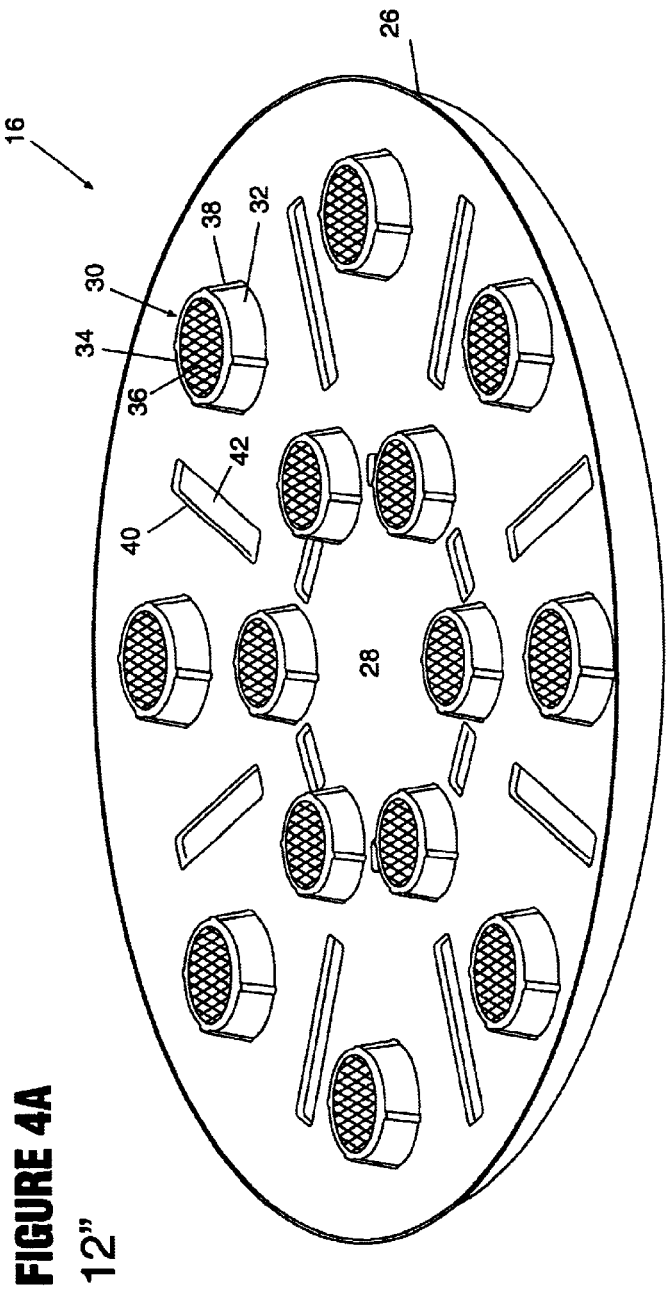
FIGS. 4A and 4B are top perspective and side views of a twelve inch saucer.

The layout of the plant saucer may take many different forms. The drawing figures show possible versions for a few different diameter saucers. For ease of understanding the same reference numbers will be used to denote similar features throughout the drawings.

FIGS. 1A and 1B are top perspective and side views of a six inch saucer 10. Each size of saucer 10 has an upturned edge 26 forming a lip or sidewall around the periphery of the saucer 10. The saucer 10 has a plurality of internal risers 30 extending upward from the base 28 of the saucer 10. The internal risers 30 may be of any convenient height to allow excess water to drain from one or more pots placed thereon. The internal risers 30 may be anywhere between 0.25 inch to 6.0 inches in height, more preferably between 0.4 and 2.0 inches, most preferably between 0.4 and 1.5 inches. The six-inch saucer 10 shown has internal risers 30 having a height of approximately 0.5 inch. The larger diameter saucers 12, 14, 16, 18, 20 shown in the other figures have internal risers 30 having a height of approximately 1.0 inch. The internal risers 30 hold the pot up substantially from the base level 28 of the saucer 10, thereby allowing a substantial amount of water to drain into the saucer 10 without building up water in the bottom section of the pot. The height of the internal risers 30 also promotes air circulation below the pot to allow any water therein to quickly evaporate, thereby decreasing the likelihood of mold and fungal growth in standing water. In the embodiments shown, the top surface 34 of the internal risers 30 is at an elevation below the top of the upturned edge 26. However, in other embodiments, the internal risers 30 may be equal in height to or have a greater height than the upturned edge 26.

The internal risers 30 may be of any suitable shape. For ease of molding, currently the risers 30 have a round footprint with sloped sides 32 to provide easy mold release. However, the risers 30 could also be square, rectangular or have any other suitable regular or irregular shape. The risers 30 may have a diameter of anywhere from 0.1 to 5.0 inches in diameter, more preferably between 0.25 to 2.0 inches, most preferably between 0.5 to 1.5 inches. The risers 30 shown have a footprint of approximately 1.25 inches in diameter and decrease to a diameter of approximately 1.0 inch. The slope of the sides 32 may be greater or smaller, if desired.

In order to allow the user to place one or more pots on the saucer 10, the risers 30 are distributed throughout the footprint of the saucer 10, as shown. To provide good support for the pot, the size and location of the risers 30 is selected to assure that at least one, and for most sizes three to five or more, risers 30 will be located beneath the base of the pot no matter where the pot is placed upon the saucer 10. The risers 30 in the present invention make up at least 5 percent of the footprint of the saucer 10. The risers 30 preferably make up between 5 and 50 percent of the footprint, more preferably between 5 and 25 percent of the footprint, most preferably between 7 and 20 percent of the footprint. In the embodiments shown, the risers 30 make up 7.5 and 14 percent of the footprint of the saucer 10. The greater the amount of the footprint is taken up with the risers, the smaller the volume of water the saucer is capable of holding. Therefore, a balance is struck between the versatility and stability of pot placement on the saucer and amount of water that can flow into the saucer.

The shape of the internal risers 30 shown has a flat, textured top surface 34 to promote traction between the bottom of the pot and the top 34 of the riser 30. This inhibits movement between the two to allow the pot to remain steady and secure atop the risers 30. The texturing 36 may take any suitable form, such as concentric circles, crosshatch, or any other geometric, non-geometric or decorative shape. In other embodiments, additional traction pads made of rubber, felt, etc. could be added to the tops of the internal risers 30 and temporarily or permanently bonded or adhered. The internal riser 30 may also have ribs 38 extending up the sides of the riser 30. The ribs 38 strengthen the riser 30, thereby allowing the riser 30 to support more weight. Although the risers 30 shown have the characteristics mentioned above, in alternate versions, the risers 30 may be smooth and/or dome-shaped or any other suitable shape.

The saucer 10 has a plurality of feet 40 extending downward from the base 28 of the saucer 10. The feet 40 are designed to hold the base 28 of the saucer 10 up from the floor on which the saucer 10 rests. The feet 40 promote ventilation beneath the saucer 10 so that if any moisture is present or forms below the saucer 10, air may circulate to inhibit the growth of mold, mildew, etc., thereby reducing or preventing stains and deterioration of the deck, carpet or floor on which the saucer 10 rests. In the embodiment shown, the feet 40 are generally rectangular and/or curved and have a flat bottom surface 42. However, the feet 40 may be any other suitable shape, such as round, square, oval, etc. The feet 40 may be virtually any height from approximately 0.05 inches. The feet 40 could be used to place the saucer 10 at any height above the ground. For typical pots, a height between 0.05 and 2.0 inches is preferred, more preferred is a height between 0.1 and 1.0 inch, and most preferably between 0.15 and 0.5 inches tall. The embodiments shown have a height of approximately 0.25 inches. The feet 40 may be straight and/or curved, as shown, or they may be jagged or take other forms.

The saucer 10 may be made of any suitable material, such as plastic, metal, glazed or unglazed ceramic, porcelain, glass, etc. Coated materials may also be used, such as porcelain-covered meal, plastic coatings over, metal, wood, etc. Currently, the saucers 10 are made of a translucent frosted plastic such as polyethylene terephthalate (PET) or recycled polyethylene terephthalate (RPET). If a frosted plastic or a frosting treatment is used, it helps to hide any mineral deposits that build up due to the evaporation of excess water from the saucer, thereby improving the appearance. The saucers 10 may also come in a variety of other frosted, clear or opaque colors and styles, including terra cotta, hunter green, red, white, gold, silver, blue, etc. The plastic versions of the saucer 10 may be formed in any suitable manner, including vacuum forming, compression molding, injection molding, etc. The thickness of the plastic saucer 10 may be anywhere from 20 mils to 80 mils depending on the size of the saucer and the weight of the item(s) to be placed thereon. For most sizes, the thickness will be from 30 to 50 mils. Currently, the saucers 10 are formed from 35-mil plastic. In this version, both the risers 30 and the feet 40 are hollow, thereby creating a uniform thickness throughout the saucer 10. This is advantageous for molding, but also has the added benefit of allowing the hollow feet to provide a space for additional volume of water draining from the pot. For other materials, such as ceramic, the thickness of the base 28 may be anywhere from the 20 mils for plastic up to an inch or more to support the weight. With these thicker materials, the saucer 10 may not be a constant thickness, as shown. In these cases, the base could be one thickness and solid or hollow feet 40 and risers 30 could be added.

The material for the saucer 10 may optionally include additives. For example, Bacillus Thuringiensis (BT) may be used. BT is a bacterium that is virtually non-toxic to plants, humans and pets, but causes disease in insects, thereby inhibiting the maturation of mosquito larvae.

The saucers 10 may have a variety of shapes and sizes anywhere from an inch or less to 48 inches or more in diameter. Currently, the saucers 10 are designed in 2, 4, 6, 8, 10, 12, 14, 16, 17 and 18 inch sizes. However, if preferred, they may be formed in alternate sizes. The saucer 10 may be sized fairly similar to the bottom of the pot, or the saucer 10 may be larger than the pot. Users may choose to use a single large saucer 10 and arrange a plurality of smaller pots thereon. The saucers 10 may also be square, oval, rectangular or other regular or irregular shapes.

Figure 4B:
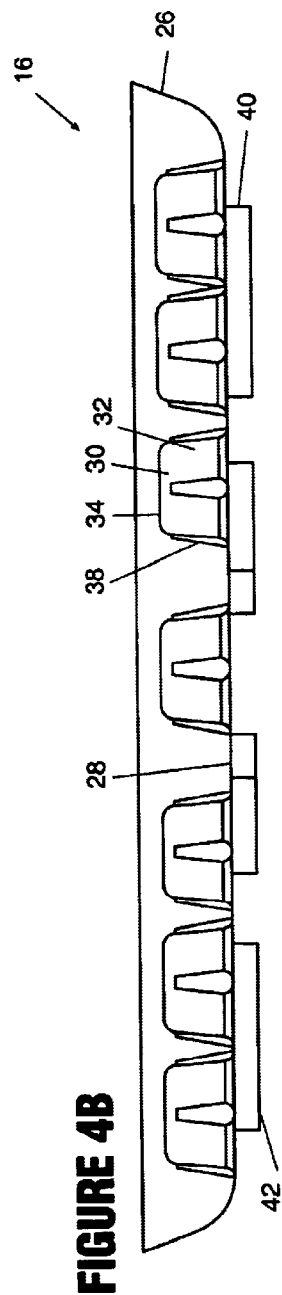
Figure 6A:
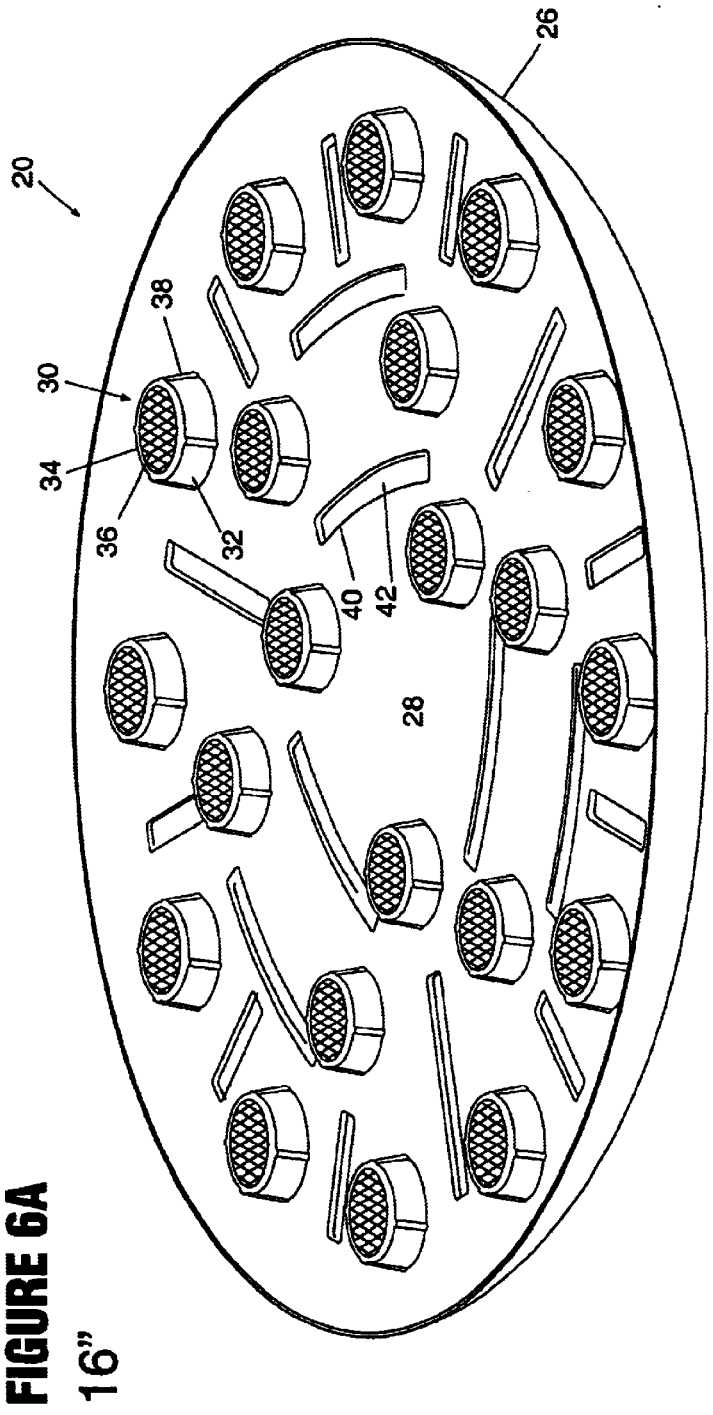
FIGS. 6A and 6B are top perspective and side views of a sixteen inch saucer.
Figure 6B:
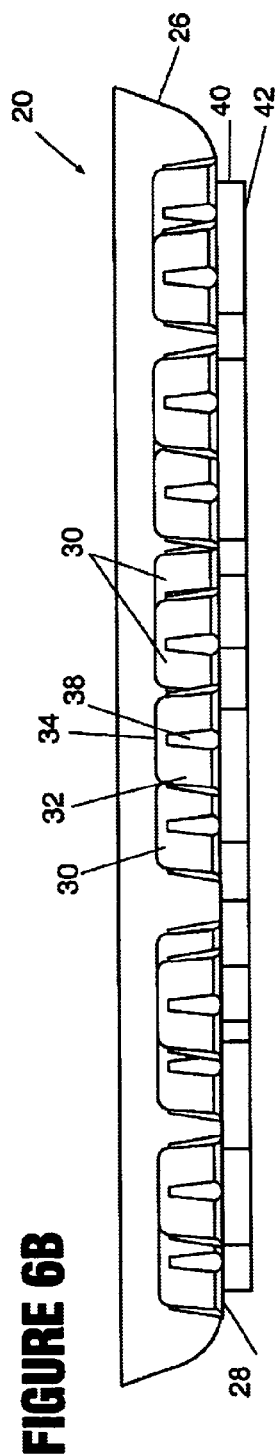

The layout of the internal risers 30 and feet 40 may take many different forms. The six-inch saucer 10 shown has five risers 30 and five feet 40. FIGS. 2A and 2B are top perspective and side views of an eight-inch saucer 12 having five risers 30 and five feet 40. FIGS. 3A and 3B are top perspective and side views of a ten-inch saucer 14 having twelve risers 30 and twelve feet 40. FIGS. 4A and 4B are top perspective and side views of a twelve-inch saucer 16 having fourteen risers 30 and fourteen feet 40. FIGS. 5A and 5B are top perspective and side views of a fourteen-inch saucer 18 having eighteen risers 30 and twelve feet 40. FIGS. 6A and 6B are top perspective and side views of a sixteen-inch saucer 20 having twenty-one risers 30 and eighteen feet 40. Other layouts with either more or fewer internal risers 30 and/or feet 40 may be used for any of these embodiments depending on the weight, size and arrangement of pot(s) to be placed thereon.

Many features have been listed with particular configurations, options, and embodiments. Any one or more of the features described may be added to or combined with any of the other embodiments or other standard devices to create alternate combinations and embodiments.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A plant saucer for holding a plant in a pot at a level above a level of water that may be present within the plant saucer, said plant saucer comprising:

a generally planar base having a periphery, a sidewall extending around said periphery of said base and having a top edge, a plurality of generally round risers extending upward from said base, said plurality of risers have a textured, generally flat top surface and a sloped sidewall, said risers having a height between 0.25 inch to 6.0 inches, said risers having a diameter between 0.1 to 5.0 inches, said plurality of risers located such that when the pot is placed anywhere within a footprint of said saucer, at least one of said plurality of risers is located directly below the pot, wherein said top surface said plurality of risers is at approximately the same elevation as said top edge of said sidewall, a plurality of ribs extending up said sloped sidewall, and a plurality of feet extending downward from said base, said plurality of feet having a generally flat bottom surface, a first group of said plurality of feet being linear, a second group of said plurality of feet being arcuate, said plurality of feet having a height between 0.05 and 2.0 inches, wherein each of said plurality of feet and said plurality of risers is spaced apart from all other of said plurality of feet and said plurality of risers, and wherein said plant saucer is between 2 and 18 inches in diameter.

* * * * *